Dec. 11, 1951 H. HARRISON 2,578,299

VECTOR ANALOG COMPUTING MECHANISM

Filed Jan. 12, 1946 8 Sheets-Sheet 1

Henry Harrison
INVENTOR

BY
ATTY. & AG'T.

VECTOR ANALOG COMPUTING MECHANISM

Filed Jan. 12, 1946

8 Sheets-Sheet 2

Henry Harrison
INVENTOR

BY Newton M. Perrins
F. M. Emerson Holmes
ATT'Y. & AG'T.

Henry Harrison
INVENTOR
BY Newton M. Perrins
F. M. Emerson Holmes
ATT'Y. & AG'T.

Dec. 11, 1951 H. HARRISON 2,578,299

VECTOR ANALOG COMPUTING MECHANISM

Filed Jan. 12, 1946 8 Sheets-Sheet 4

Henry Harrison
INVENTOR
BY [signature]
ATT'Y. & AG'T.

Henry Harrison
INVENTOR
BY
ATT'Y. & AG'T.

Dec. 11, 1951 H. HARRISON 2,578,299

VECTOR ANALOG COMPUTING MECHANISM

Filed Jan. 12, 1946 8 Sheets-Sheet 6

Henry Harrison
INVENTOR

BY Newton M. Perrins
E. M. Emerson Holmes
ATT'Y. & AG'T.

Dec. 11, 1951 H. HARRISON 2,578,299

VECTOR ANALOG COMPUTING MECHANISM

Filed Jan. 12, 1946 8 Sheets-Sheet 7

Henry Harrison
INVENTOR

BY Winston M. Parrus
F. M. Emerson Holmes
ATT'Y. & AG'T.

Henry Harrison
INVENTOR
BY [signature]
[signature]
ATT'Y. & AG'T.

Patented Dec. 11, 1951 2,578,299

UNITED STATES PATENT OFFICE 2,578,299

VECTOR ANALOGUE COMPUTING MECHANISM

Henry Harrison, Rochester, N. Y., assignor to Eastman Kodak Company, Rochester, N. Y., a corporation of New Jersey Application January 12, 1946, Serial No. 640,961

9 Claims. (Cl. 235—61.5)

This invention relates to computing mechanisms and specifically to mechanisms for computing a future position of a moving target. Since the direction and distance of a target constitute a vector, the present invention is fundamentally a device for solving vectors, i. e. for analyzing a vector into its component parts with respect to some standard coordinate system or for synthesizing a vector from its component parts.

The primary object of the present invention is to provide a simple accurate vector solver. It is a particular object of the invention to provide a vector solver utilizing electric signals which can be transmitted readily by suitable circuits.

It is the object of one embodiment of the invention to predict the future position of a moving target such as an airplane and to control the setting of a gun aimed at this target. This particular embodiment utilizes two of the vector solvers, one of them first to analyze the target vector at a given instant and then to synthesize it and analyze its future components during tracking of the target. The second vector solver transforms these component vectors into predicted vector components which in turn are used to control the gun position. Modifications of this embodiment allow the introduction of the various ballistics such as superelevation of the gun, projectile drift, wind, etc., to be introduced automatically in the vector solutions to insure that the gun orientation includes these corrections superimposed on the predicted target position vector.

According to the invention a vector solver is made up of at least two parts, one having at least one dipole electric coil wound on a substantially spherical core with the turns of the coil distributed effectively uniformly with distance along a diameter of a sphere which diameter is the dipole axis. This coil structure is called a "dipole" coil because current passing through it sets up an external magnetic field substantially similar to the field of a magnetic dipole. The term "dipole coil" has long been used to describe vanishingly small coils which set up the same type of magnetic field.

As is known in electromagnetic theory, a dipole is one of the two magnetic field structures having three dimensional vector qualities, i. e. they can be added and resolved like vectors and in fact a dipole is the only field structure which has three dimensional vector properties outside of the field creating means (e. g. outside of the coil). It is for this reason that a dipole is used in the present invention.

A very important advantage of my type of dipole is that it gives a larger mutual inductance than other structures which of course is essential in any practical circuit. If a perfect sphere were used with an infinite number of turns in the coil, the turns should be distributed exactly uniformly provided the pickup coils defined below are concentric with the dipole coils. Obviously this theoretical condition is not practical and hence various modifications are used, but all of them have the turns of the coil distributed effectively uniformly. In one form, the turns are grouped in equal groups each group lying in a plane and the planes uniformly spaced along said diameter. For example a coil is wound on a sphere with eight or more groups, preferably about twenty groups distributed on the sphere surface (the distribution being uniform in accordance with the sine of the latitude, which is uniform along the axis of the sphere) and with forty turns in each group. Slight variations from true linearity or from a true sphere may be utilized to eliminate second and higher order terms from the cosine relationship of the mutual inductance between this dipole coil and any coil located outside of the dipole coil.

The other part of the vector solver is not nearly so critical in structure. It must have at least one electric coil, which may or may not be a simple ring coil lying in a plane and which may be located anywhere outside of the dipole coil, preferably with the area of the outside coil subtending as large a solid angle as practical at the center of the dipole coil. The outside coils are usually referred to as pickup coils although in practice the signal may be transmitted either way. It is possible even in practical embodiments to have one or more of the outside or pickup coils concentric with the dipole but often the mounting of the dipole coil does not easily permit three orthogonally oriented pickup coils to be simultaneously around the dipole although any mechanism which permits complete universal motion of a dipole coil relative to its support would work inside of a cube of pickup coils or inside three mutually orthogonal pickup coils concentric with the dipole coil.

One essential feature of the present invention is that the coils must be mounted to permit relative rotation of the two parts of the solver about the center of the dipole coil only. This is true whatever the shape or location of the pickup coil. The essential features are thus the particular winding of the dipole coil or of each dipole coil if there are more than one, the fact that the pickup coils are outside of the dipole coils and the fact that the relative movement of the two parts of the solver is restricted to rotation about the dipole center. With such an arrangement, an alternating electric current applied either to the dipole coil or to the pickup coil will induce a voltage in the other coil proportional to the cosine of the angle between the axis of the dipole and the effective axis of the pickup coil. In simplified embodiments in which the geometric axis of the pickup coil passes through the center of the dipole coil, the geometric axis is the effective axis. Otherwise the effective axis is a line from the center of the dipole coil through the pickup coil as determined by well known rules for computing mutual inductance of two coils.

Such a device with but one dipole coil and one pickup coil gives directly one component of a vector. For complete analysis of a vector represented by a current through the dipole coil, into Cartesian components, three pickup coils are required with their axes mutually orthogonal and all three mounted outside of the dipole coil. For complete synthesis and complete re-analysis of a general three-dimensional vector from one set of coordinates to another, it is preferable to have, in addition to the three pickup coils, three concentric dipole coils with their axes mutually orthogonal mounted on the spherical core rotatable as a unit about the center of the dipole sphere.

Although the application of this vector solving system to gun directors is relatively complicated to describe, it is simple to manufacture, much less expensive and more accurate than any previous gun directors of comparable versatility. The resulting instrument is relatively small, relatively light, and could even be made so inexpensively as to be considered expendable in time of war although the more refined forms are of course more expensive.

According to the specific embodiment of the invention applied to gun directing, two vector solver systems are used, one known as the memory point solver and the other as the prediction solver. The target is tracked and its range measured continuously so that at each moment there is a vector corresponding to the target position. At a certain instant, referred to as the memory point instant, the position vector is recorded and the vector representing the direction and velocity of the target is computed simply by subtracting the memory point vector from the present vector (in practice both are divided by the memory time interval) at any moment subsequent to the memory point instant. Assuming that the target continues to move in a constant direction at a constant velocity, the invention can continuously compute the future vector along which the gun should point now so that a projectile travelling at known speed will arrive simultaneously with the target at some future position. The memory point solver is used for analyzing the memory point vector into components and then for synthesizing this memory point vector during all future calculations and for giving the components thereof in terms of present position polar coordinates. The time interval between present and future position is fed into the calculations as described in detail below and these component signals are applied to the prediction solver with suitable ballistic corrections so that the dipole coils create a magnetic field having the direction and magnitude of the future target position vector. The pickup coils of the prediction solver in turn control the gun position. Actually the computing involves regeneration of the final result so that the predicted time of flight obtained from the predicted position vector is fed back into the prediction vector solver along with data from the memory point solver.

The various forms of the invention, the theory of operation thereof, and all necessary details will be fully understood from the following description when read in connection with the accompanying drawings in which.

Figure 4:
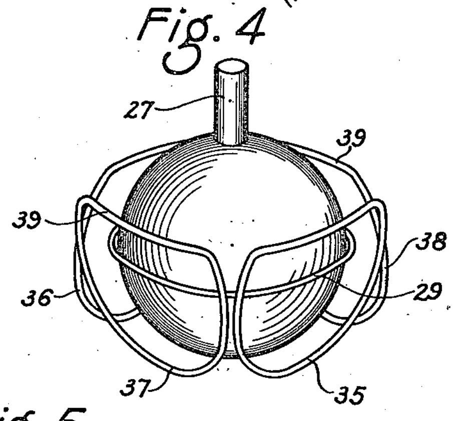

Fig. 4 similarly shows another embodiment.

Figure 5:
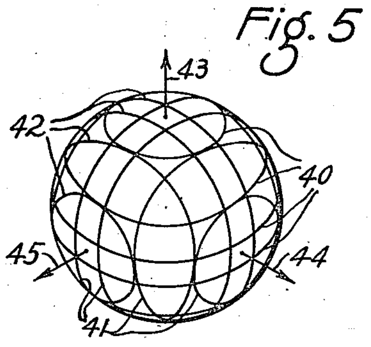

Fig. 5 is a perspective view of a triple dipole coil according to a preferred embodiment of the invention.

Figure 6:
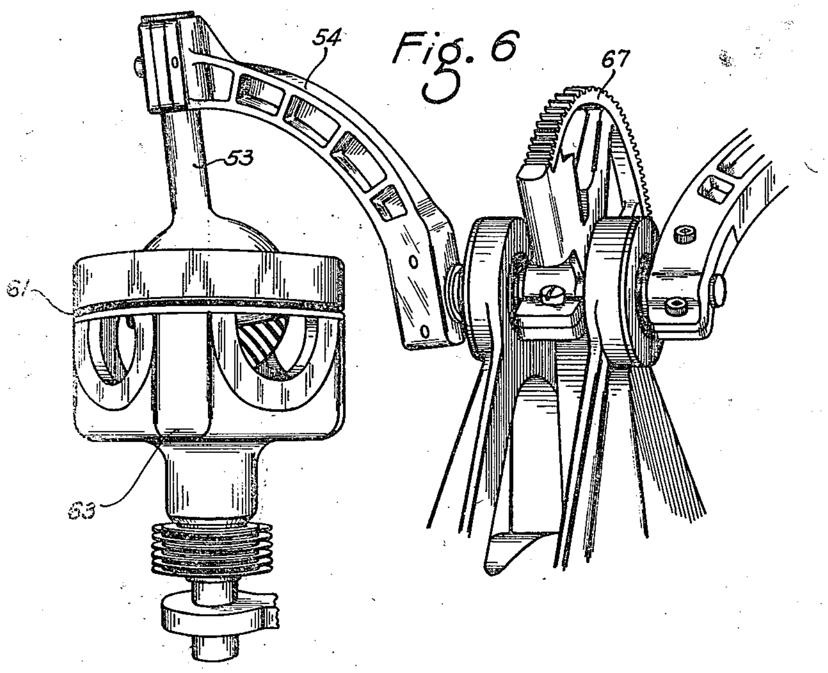
Figure 7:
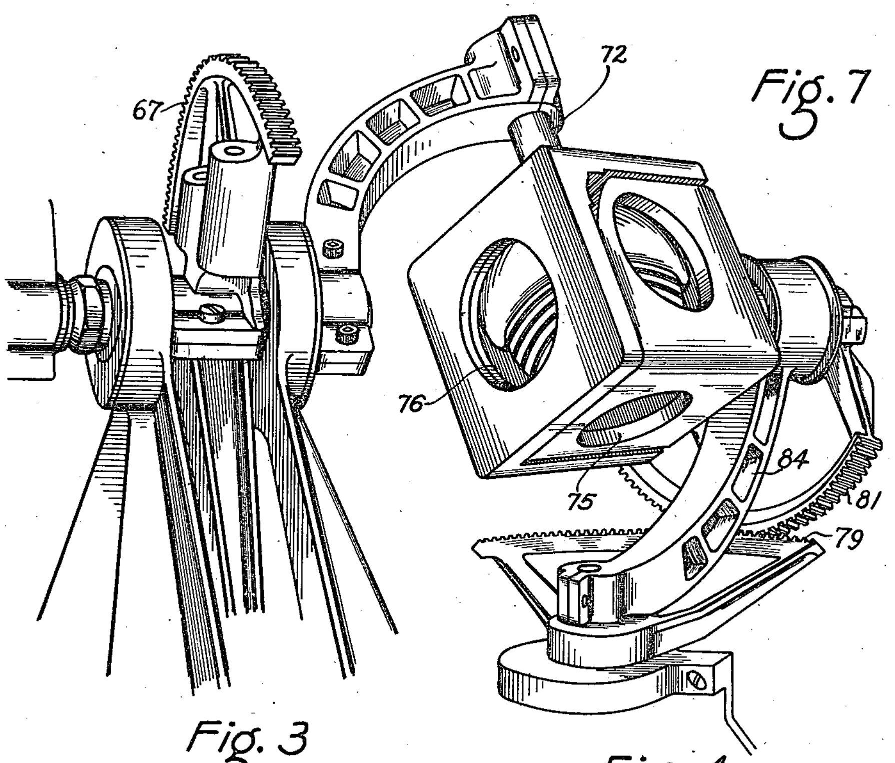

Figs. 6 and 7 are perspective views of the vector solver parts of a gun director incorporating the invention.

Figures 8, 8A:
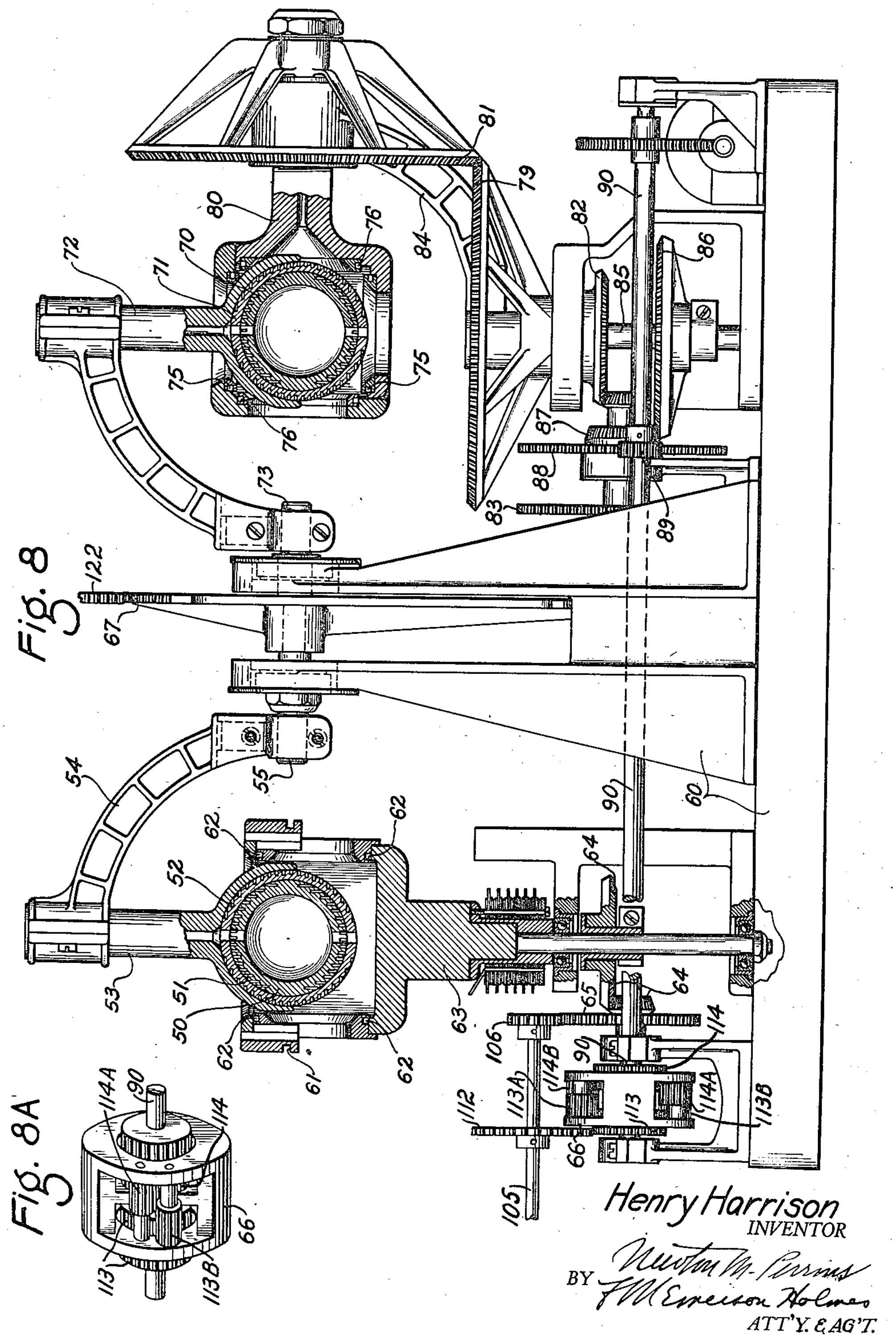

Fig. 8 is a front elevation partly in section showing both of these solvers.

Figure 9:
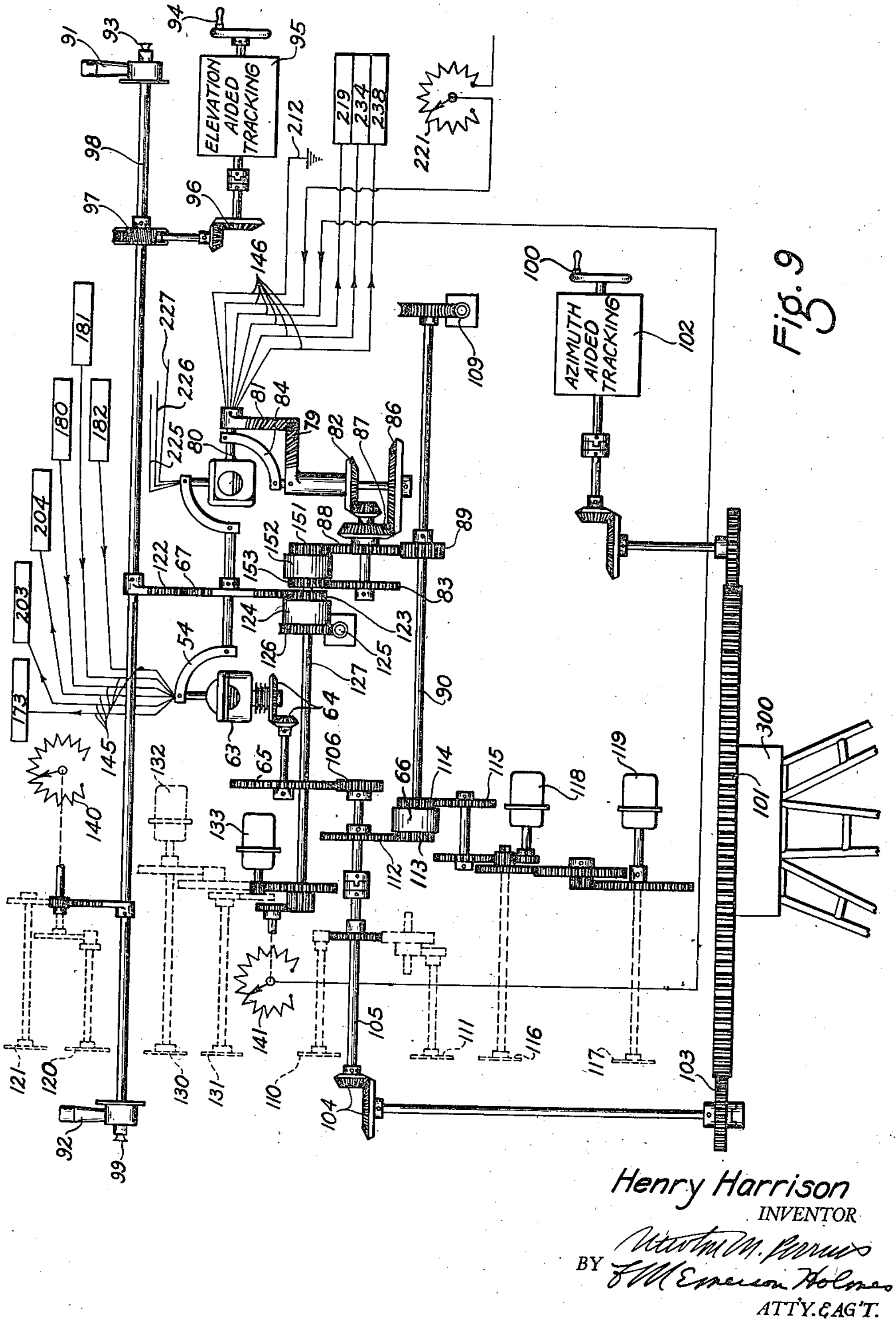

Fig. 8A is an enlarged perspective view of a differential gear, three of which are shown in Fig. 9.

Fig. 9 shows the essential mechanical parts of the computer mechanism of the gun director.

Figures 10A, 10B:
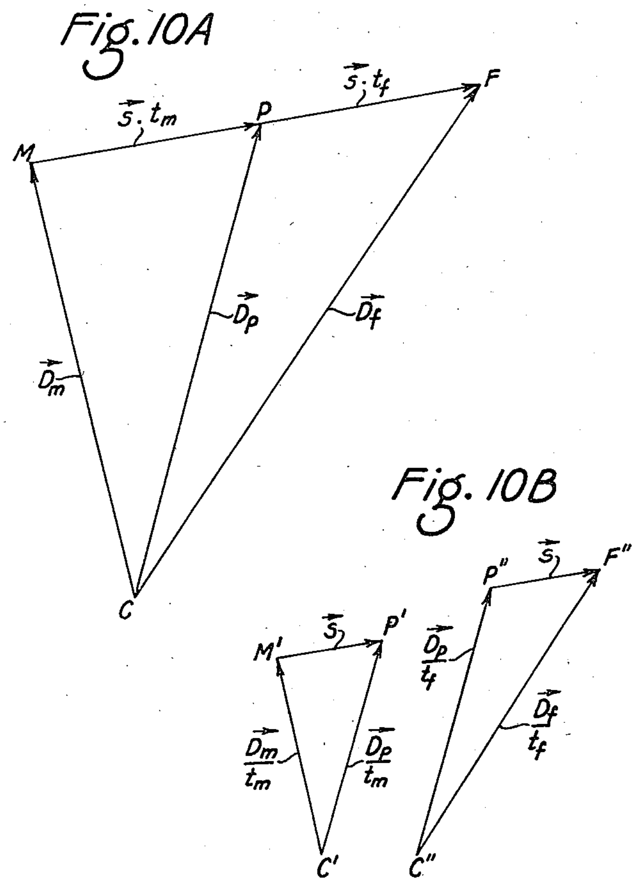

Figs. 10A and 10B are vector diagrams of the mathematical problem solved by the director.

Figure 11:
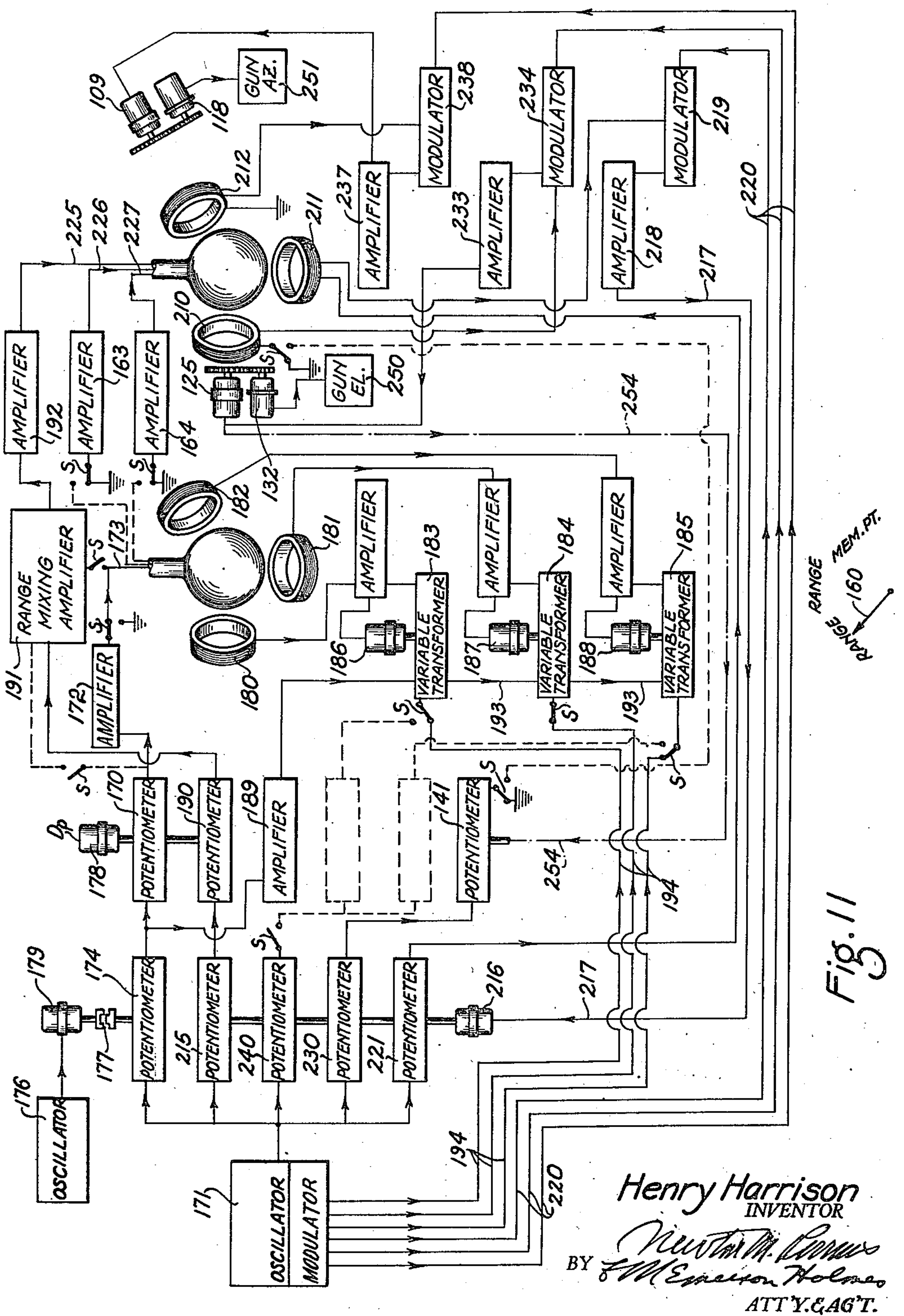

Fig. 11 is a schematic showing of the electric circuit of the computer during the first stage of operation thereof.

Figure 12:
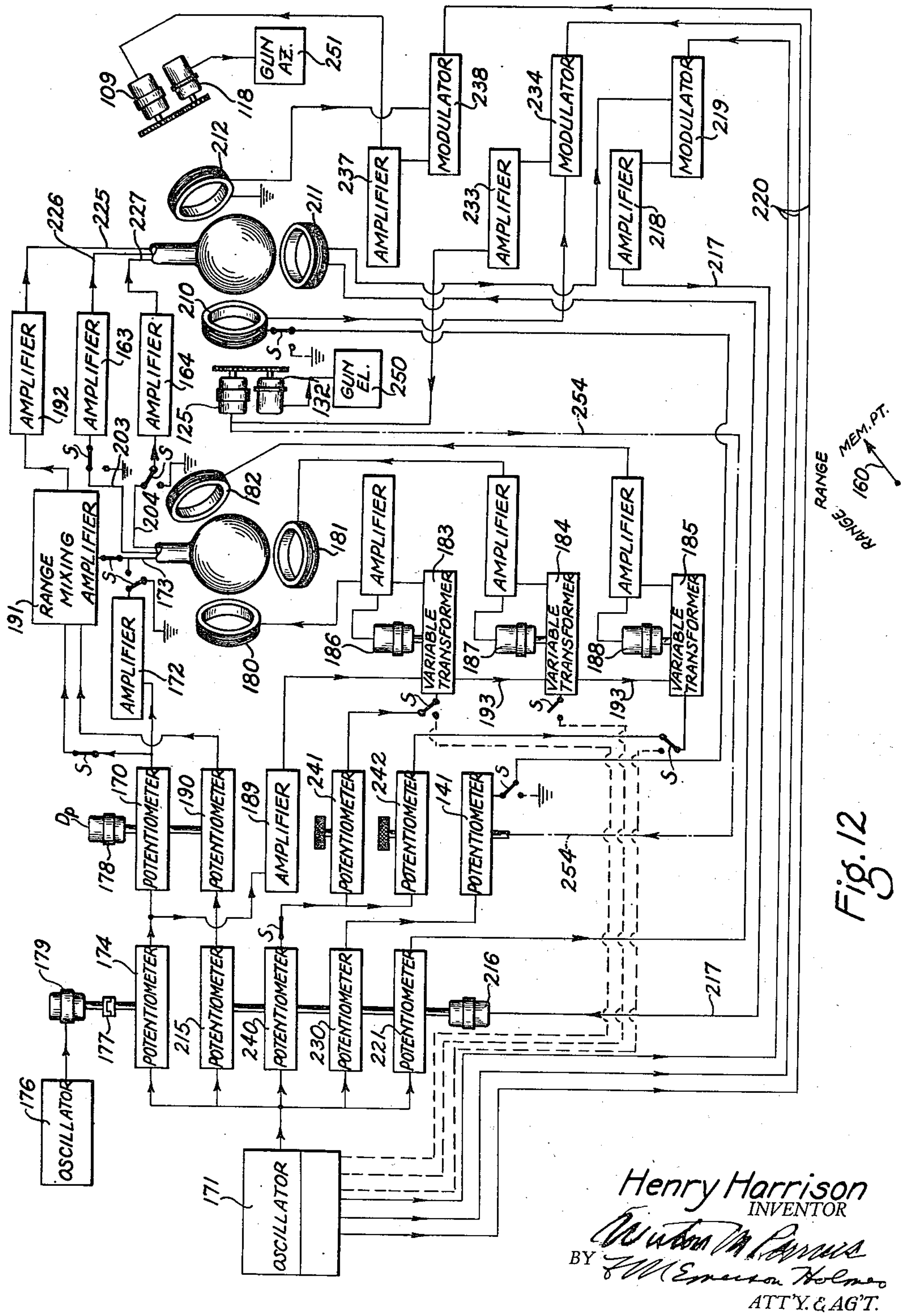

Fig. 12 similarly shows the circuit during subsequent stages.

Figs. 13 to 18 inclusive show mechanical details of the director which are shown in rectangles only in Figs. 9 to 11.

Figure 1:
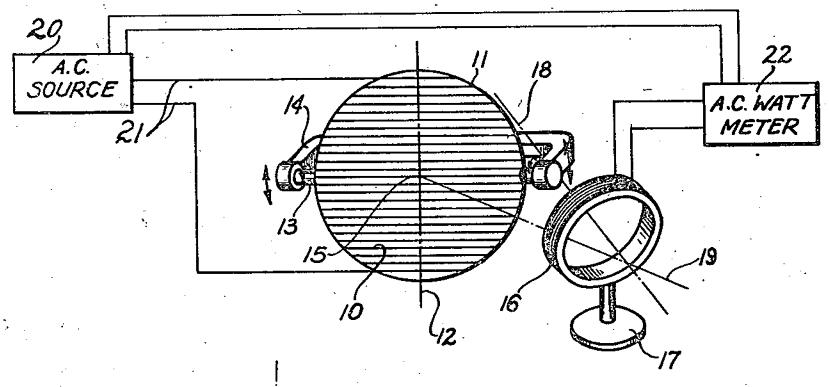
Fig. 1 shows, partly schematically, a vector solver according to the invention.

In Fig. 1 a dipole coil 10 is wound on a spherical core 11 with the turns of the coil uniformly distributed along a diameter 12 which is the dipole axis. The coil is mounted by pins 13 in a gimbal 14 to permit universal motion of the axis 12 with respect to the center 15 of the sphere.

Another coil 16 which may have practically any shape is mounted entirely outside of the dipole coil but of course near enough to have a measurable mutual inductance therewith. This coil is held by a support 17, fixed relative to the support for the dipole and hence fixed relative to the center 15. For the sake of generality in this discussion, the coil 16 is oriented with its geometric axis 18 obliquely arranged with reference to the center 15 of the dipole. In actual practice the outer coil is arranged to have its axis 18 pass through or near the center 15. When it does pass through the center 15, the mutual inductance is proportional to the cosine of the angle between the axis and the dipole axis 12. For every form of external coil there is a line 19 through the center 15 which can be considered the effective axis of the outer coil. The mutual inductance is a maximum when the dipole axis 12 lies along this effective outer coil axis 19 and it is zero when the dipole axis 12 is at right angles to the effective axis 19 and between these limits depends on the cosine of the angle between the axes. For a thorough mathematical discussion on the vectorial relation of applied and induced voltages, reference is made to "Electromagnetic Theory" by Stratton, 1941, McGraw-Hill, p. 228, last four lines; also note pages 182 and 263 (prob. 6).

A signal may be applied to either coil and the induced voltage read across the other coil. In the drawing, an A. C. source 20 through leads 21 sets up an alternating current in the dipole coil 10. An A. C. wattmeter 22 connected across the coil 16 is responsive to the voltage induced in the coil 16. The wattmeter connections are immaterial but preferably the A. C. source is the current source for the wattmeter as well as dipole coil in which case the pick up coil supplies the voltage winding of the wattmeter. A wattmeter, rather than a voltmeter is used because it is phase sensitive.

Figure 2:
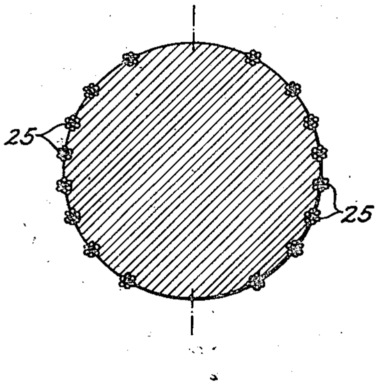
Fig. 2 shows a particularly useful form of dipole for use in the invention.

For a perfect dipole field, there should be an infinite number of turns in the coil 10. However, practical approximations to this theoretical optimum can easily be made. In the first place it appears to be quite satisfactory to have the turns of the dipole coil grouped into equal groups 25 as shown in Fig. 2, of say 40 turns each and to have these groups uniformly spaced along the dipole axis 12. Depending on the accuracy required, as few as eight such groups appear to be quite satisfactory although in practice I have used 20 groups. If still fewer groups are used, the relationship of the mutual inductance differs slightly from a true cosine one. In these approximations to true uniformity of distribution of the turns of the coil, it can be shown by expressing the magnetic field in spherical harmonics that the mutual inductance relationship varies with the angle between the axes not as a pure cosine law, but as a cosine plus higher powers of the cosine. To eliminate these higher orders or at least to render their effect negligible, the distribution of the groups of turns may be varied slightly from true uniformity. For example, when twenty groups of turns are to be wound on a sphere two units in diameter the two outside or polar groups should be .9542 unit from the equatorial plane of the dipole. The separation of the planes of the groups from the equatorial plane is given in the following table. Since the groups are symmetrically arranged on the sphere, each figure represents two of the groups. Incidentally, useful effects are obtained when less than the full number of groups are used, for example just those in the upper hemisphere, provided the pickup coil structure is symmetrical about the center of the sphere.

*Relative dipole coil groove spacing*

| | | | | | |
|---|---|---|---|---|---|
| .0495 | .1485 | .2385 | .3495 | .4504 | .5609 | .6497 |
| | .7471 | .8462 | .9542 | | | |

True uniformity in spacing of the groups would require these values to read .05, .15, .25, etc. Alternatively the core of the dipole need not be perfectly spherical but in all practical cases must be very close to spherical. It may be made spheroidal to a slight degree to eliminate the higher order cosine effects in the mutual inductance while the coil turn groups are strictly uniformly distributed along the axis. In the second place, the remaining perturbations in the field of the dipole coil structure can be made relatively less important by making the pickup coil 16 larger and more nearly concentric with the dipole coil 10.

The "dipole" is the first of a theoretical series (namely the expansion of a line symmetric external magnetic field in non-associated Legendre polynomials). The "quadripole" is the next member but is not obtainable with symmetric pickup coils. The "octipole" is available however merely by a different distribution of turns. A combination of dipole and octipole may be obtained by winding two coils on the same form. The same is true for combinations with higher order members of the series.

Figure 3:
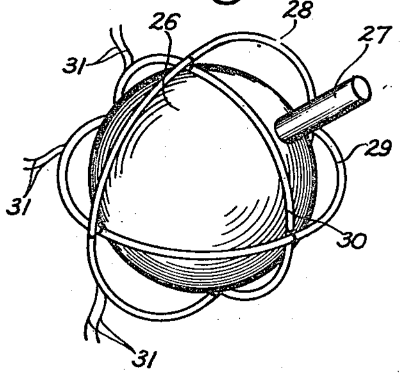
Fig. 3 is a perspective view of a preferred form of the essential unit of the invention.

Fig. 3 shows a preferred arrangement of the invention wherein a dipole coil 26 whose windings have been omitted for the sake of clarity, is carried on a support 27. Outside of the dipole, there are three ring coils 28, 29, and 30 concentric with the dipole and with their axes mutually orthogonal. The leads to the outside coils are shown at 31. If the outer coils are moved, the amount of rotation is limited by the fact that the support 27 must protrude through one of the quadrants formed by the coils 28, 29, and 30. This is but one possible arrangement; many modifications thereof can produce an equally satisfactory cosine relationship but this same restriction, of course, is present whenever the dipole 26 is rigidly attached to the support 27. Bulky metallic parts should not be used near the dipole structure because in the presence of alternating magnetic fields they carry induced currents which reflect perturbing fields which destroy the desired cosine relationship of mutual inductance. In practice, the relative motion of the coils often need not be greater than some specified angle determined by the problem to be solved. For example in intermediate range anti-aircraft fire control it is unnecessary to make computations which would direct the gun to point more than 10° below the horizon or more than 30° from the line of sight. Therefore many practical embodiments can be devised in which the dipole 26 is rigidly attached to its support 27 and in which the outer coils are shaped to permit the support 27 to move through whatever angle is required.

One such arrangement is shown in Fig. 4 in which the outside coil 29 with its axis vertical is still concentric with the dipole, but in which the other two coils are each replaced by a double coil system. Two coils such as 35 and 36 connected in series and located in substantially parallel planes on opposite sides of the dipole form one pickup unit. The other is formed of coils 37 and 38 similarly connected together. The double coil system has the advantage over a single coil located at one side of the dipole (coil 35 alone for example) in that the mounting of the dipole is not so critical. For example if the center of the dipole is somewhat off so that it moves nearer the coil 35 during rotation, it simultaneously moves further from the coil 36 which of course reduces the change in the total mutual inductance. I have found that it is better to have the pairs of coils in substantially parallel planes since the compensation of errors is better under this condition. In Fig. 4 the top 39 of each of the vertical coils has been bent out of the plane of the rest of the coil in each case, to permit even greater freedom of motion for the dipole support 27. As pointed out in connection with Fig. 1 the outside coils may theoretically have any desired shape. Only the shape of the dipole coil is critical.

The preferred form of dipole unit has three concentric dipoles consisting of coils 40, 41 and 42 with their respective axes 43, 44 and 45 mutually orthogonal as illustrated schematically in Fig. 5. A completely ideal arrangement would be to have such a triple dipole inside of three ring coils as shown in Fig. 3. From a practical point of view the only condition under which the axes of either the three dipoles or the three outside coils should be other than mutually orthogonal is when one wishes to make computations in coordinate systems which are not orthogonal. This field is relatively unexplored and hence the present invention is described only with respect to orthogonal coordinate systems. In Fig. 5 each dipole consists only of six groups of turns since the illustration would be confused if more were included. Incidentally in mounting such a dipole in either the arrangement shown in Fig. 3 or that shown in Fig. 4 the support 27 need not have any particular orientation relative to the axes of the dipole.

Figs. 6, 7, and 8 show two vector solvers each having three mutually orthogonal dipole coils inside three mutually orthogonal pickup coil systems. The memory point solver shown in Fig. 6 and at the left of Fig. 8 will be described first. Two of the dipole coils are wound on an inner core 50. One of them is wound in grooves 51 so that in Fig. 8 its axis is in the plane of the paper and horizontal. The other has its axis perpendicular to the plane of the paper and hence the grooves in which it is wound do not appear in Fig. 8. They are in planes parallel to the plane of the paper. The third dipole coil is wound concentric with the other two in grooves 52, for example on a separate outer shell as shown. The three dipoles are carried on a support 53 which, through an arm 54, allows rotation of the dipole about a horizontal axis 55 which axis projected would pass through the center of the dipole. For practical convenience the support 53 and the arm 54 are located as shown in Fig. 6 at an angle to the axis of the dipole coil in the grooves 52, but this modification is omitted from Fig. 8 since it is not essential to the operation of the invention and since the simpler setup shown in Fig. 8 permits clearer explanation of the invention. The whole vector solver is carried on a support 60 which in turn is mounted in a housing, not shown, all of which is mounted to permit rotation in azimuth. That is, the whole housing is swung around to the desired azimuth and the arm 54 is rotated about the axis 55 until the dipole axis of the coil 52 which is the "range coil" points toward the target. Again in actual practice it has sometimes been found desirable to point this axis toward a mirror image of the actual target since this does not effect the computations in any way. Tracking the target in azimuth by rotating the whole housing and in elevation by rotating the arm 54 about the axis 55 is done by means of sighting telescopes and power drives not shown in these particular figures.

Entirely outside of, and near, the memory point dipoles are three coil systems with their axes mutually orthogonal. One of these with its axis vertical (coil 181 of Fig. 11) is wound in a groove 61 concentric with the dipoles. In use, the computer is set up so that this vertical axis is actually vertical with respect to ground, since in anti-aircraft fire the super elevation of the gun must be in terms of the true vertical, but in any system independent of or neglecting the effects of gravity, the term vertical should be construed merely with respect to the rest of the system. A coil system (180 of Fig. 11) with its axis north and south is wound in two parts in grooves 62. The two parts of the coil are thus in vertical planes parallel to each other on opposite sides of the dipole. In order to permit sufficient latitude of rotation of the mount 53 about the axis 55, the axis of these coils is below the center of the dipole sphere. This, of course, tends to decrease the induced voltage which may be overcome by increasing the number of turns on the coil but in practice, the compensation is provided in the circuits themselves described later. It is preferable to have the outside coils subtend as large a solid angle as possible at the center of the dipole, but the relative dimensions shown in Fig. 8 have proven to be quite satisfactory in practice. A third set of coils (182 of Fig. 11) identical with those wound in groove 62, but with the axis of the set pointing east and west, is mounted with one coil below the plane of the paper in Fig. 8 and the other above. Hence these coils do not appear in Fig. 8.

Since the whole housing of the computer is moved in azimuth during tracking of the target, a suitable gear train must be and is provided to maintain the axes of these outer coils in a true north and south and a true east and west direction respectively. The mount 63 for the outer coils is rotated by a bevel gear 64 which in turn is driven directly by a gear train, engaging the gear 65. Actually a clutch in the gear train permits the coil axes to be set in their required north-south, east-west positions when the instrument is first set up, and then rotation of the housing relative to the base, operates the gear train which drives the gear 65. The auxiliary gear system 66 which appears in Fig. 8 transmits these changes in azimuth to the rest of the computer system and to selsyn systems which transmit orders to the gun orienting mechanism. The shaft 90 actually goes through to the differential 66 but this part of the shaft is partly cut away for the sake of clarity. The shaft 90 is connected to the housing of the differential 66 and, as described in more detail in connection with Fig. 9, two gears 113 and 114 turn freely on the shaft 90, but mesh respectively with gears 113A and 114A which are rotatably mounted on the housing 66. Actually there are two gears, 114A and 114B, engaging gear 114. Gears 113B and 114B are respectively behind 114A and 113A and mesh therewith. This is shown perhaps more clearly in Fig. 8A. Gear 112 engaging gear 113 is shown mounted on the shaft 105 whose connection to the main circuit gear of the whole system is shown in more detail in Fig. 9. The operation of gears 106 and 65 is shown in more detail in Fig. 9.

Tracking in elevation for both the memory point dipole and the prediction dipole is provide through a gear 67 which directly engages a gear connected to the sighting telescopes not shown in this figure, but described in detail below in connection with Fig. 9. Before continuing with the description of Figs. 7 and 8 certain terms are defined for precision.

"Range" refers to slant range from the director to the target; there is "memory point range" $D_m$, "present range" $D_p$, and predicted or future range $D_f$. Azimuth and elevation axes are orthogonal to the range axis and point respectively at any moment in the direction of changing azimuth and changing elevation of the target. This use of a continuously changing coordinate system is particularly useful in gun directors.

In Fig. 7 and in the right hand half of Fig. 8 there is shown a similar vector solver, the "prediction solver," consisting of three concentric dipole coils with their axes mutually orthogonal, two of them wound on an inner core 70 and one of them on an outer core 71. As before the motion of the dipole sphere is restricted to changes in elevation or tilt of the support 72 about an axis 73 in line with the center of the dipole. Changes in azimuth are again provided by the rotation of the whole computer housing. In this prediction solver all three outer coil systems are in the form of pairs of coils in parallel planes on the opposite sides of the dipoles. These outer coils are the future position coils, or when corrections such as super elevation, azimuth-drift etc. are applied, they are the gun position coils. One of them in grooves 75 with its axis vertical in Fig. 8 is referred to as the future range coil. Another wound in grooves 76 with its axis horizontal in Fig. 8 is referred to as the future azimuth coil since the axis is always kept horizontal and points in the direction of changing azimuth of the target in the predicted position (as corrected for ballistics). The third outside coil which does not appear in Fig. 8 since the parts thereof are respectively above and below the plane of the paper has its axis perpendicular to the paper in Fig. 8 and is referred to as the future elevation coil since the axis points in the direction of changing elevation of the future position. It will be noted that all three of the future position coil axes pass directly through the center of the dipole sphere in this prediction solver although, as pointed out above, this is not absolutely essential and in fact is not incorporated into the memory point solver.

Whereas the relative motion of the two parts of the memory solver was restricted to two dimensions (changes in azimuth and changes in elevation), the prediction solver has an added degree of freedom in that the pickup coils are mounted to rotate independently about both a vertical axis and a horizontal axis. Thus both the dipole coils and the pickup coils can have a change in elevation. The mount 80 for the outside coils can be rotated about the horizontal axis of the coil in the grooves 76 by bevel gears 81 and 79 driven by a bevel gear 82 which in turn is driven by a gear 83 which is driven directly by a gear train connected to the mechanism which moves the tracking telescopes in elevation. The gears 81 and 82 are supported on an arm 84 and a shaft 85 which may be rotated in azimuth (gun or future azimuth) thus rotating the whole outside or future position coil mechanism about a vertical axis. This rotation is provided through a gear 86 driven by a gear 87 which in turn is driven by a gear 88 and a gear 89 on a shaft 90. The change in elevation is not independent of the change in azimuth with the gear mounting arrangement just described. For example if one merely rotates the shaft 85 so as to produce a change in azimuth, the rolling of the gear 81 on the gear 79 will cause an apparent change in elevation. However compensation is provided by driving the gear 79 the proper amount by a differential gear arrangement engaging the gear 83 shown in greater detail in Fig. 9.

Fig. 8A is merely to show the details of the differential gear system 66. Identical differential systems are used at positions 124 and 152 in Fig. 9.

Fig. 9 shows the essential parts of the mechanical mechanism of the whole gun director. On the outside of the housing (not shown) there are two tracking telescopes 91 and 92. The observer looking in the eyepiece 93 of telescope 91 aims his telescope at the target in elevation. He does this directly by turning the crank 94 with or without electrical assistance which may be provided by an aided tracking mechanism 95. This elevation tracking through gears 96 and 97 rotates the shaft 98 in elevation only and thus keeps both telescopes 91 and 92 on target as far as elevation is concerned. The observer looking through the eyepiece 99 of telescope 92 tracks in azimuth only by rotating a crank 100. This crank is shown near the lower right hand part of the drawing for clarity but actually is located near the eyepiece 99. The whole tracking mechanism starting with the crank 100 is actually on the near side of the large gear 101 and the crank 100 is pointing in the opposite direction to that shown on the drawing. With or without the assistance of aided tracking which may be supplied by mechanism 102, this device rotates the whole housing of the computer around the gear 101 which is held stationary on a large tripod 300 fixed in place on the ground. As the whole housing and all of the mechanism shown except the gear 101 rotates in azimuth, the gear 103 rolls on the gear 101 and provides the azimuth drive for all parts of the computer system. Bevel gears 104, shaft 105, gears 65 and 106, and bevel gears 64 transmit this azimuth change directly to the outside coils (61 and 62 of Figs. 6 and 8) in mount 63 of the memory point solver so that these outside coils are held fixed with respect to the earth, specifically with their axes vertical, north and south, and east and west respectively. That is, the coil box 108 is fixed relative to the gear 101 while all the rest of the mechanism moves in azimuth. Azimuth may be read in gunnery mils on fine and coarse scales 110 and 111 respectively.

By means of a gear 112 the present azimuth setting is fed through gear 113 into a differential 66. The housing of the differential, referred to as the cage, is connected directly to the shaft 90 which feeds in the azimuth lead as determined by the prediction solver, and as driven by servo mechanism 109. The output gear 114 thus receives the present azimuth from the gear 112 and the azimuth lead from the cage of the differential and delivers the correct gun azimuth to gear 115. The value of the gun azimuth may be read in gunnery mils on fine and coarse scales 116 and 117. At the same time this correct information is delivered to the gun mechanism through selsyn systems whose transmitters are shown at 118 and 119 respectively.

Similarly the present elevation may be read in mils on coarse and fine scales 120 and 121 from the setting of the shaft 98. Present elevation as indicated by the shaft 98 is fed through gear 122 to the gear 67 which rotates both the memory dipole and the prediction dipole coils as described in connection with Fig. 8. At the same time this information is transmitted to a gear 123 on a differential 124. From a servomotor 125, the elevation lead and superelevation is fed into another gear 126 of this differential 124. The output, combining the present elevation, the elevation lead and the superelevation, is imposed on the housing or cage of the differential and on shaft 127. This gives the correct gun elevation which may be read on coarse and fine scales 130 and 131 and which is transmitted by selsyns 132 and 133 to the gun operating mechanism.

Thus I have described how the present azimuth angle plus the predicted azimuth lead and the present elevation angle plus the predicted elevation lead are combined and fed to the gun operating mechanism. I have not so far described how the azimuth lead and elevation lead are determined. This is done partly electrically and partly mechanically. The electromechanical computer receives future gun elevation from a potentiometer 141 and other information from the coils of the vector solver. The potentiometer 140 supplies present elevation angle to the aided tracking mechanism. For simplicity in this mechanical drawing the electrical connections to the three dipole coils and the three outside coil systems of the memory vector solver are merely shown by leads 145 and rectangles 173, 203, 204, 180, 181 and 182. Similarly the electrical connections to the dipole and future position coils of the prediction solver are shown by leads 146. In addition to this electrical part of the computer which is to be described later there are certain interrelationships between present azimuth and elevation and predicted azimuth and elevation which are taken care of by proper gearing.

For one thing the driving of the future position coils by servo motors 109 and 125 so that the range coil points along the predicted position vector as corrected for super elevation, azimuth-drift, etc. requires constant correction of the elevation changing mechanism with respect to any azimuth change and azimuth lead. Through gear 89 the azimuth lead is fed to the gear 88 and hence through gear 87 to the gear 86 to rotate the future position coil housing 80 in azimuth as described above. At the same time, this azimuth lead is fed to a gear 151 which is part of a differential 152 the cage of which is connected to the shaft 127 which hence is set in accordance with true gun elevation. The output of the differential 152 on gear 153 is thus true gun elevation plus azimuth lead. This rotates gear 83 which in turn rotates the bevel gear 82 and adjusts the elevation setting of the future position coil mount 80. Thus the latter elevation is set in accordance with true gun elevation (which is present elevation plus elevation lead plus superelevation) and in accordance with azimuth lead which takes out of the elevation setting the effect of rotating the arm 84 in azimuth causing the gear 81 to roll on the gear 79.

Before going to the description of the electrical connections a brief discussion of the vector problem to be solved is given here with reference to Figs. 10A and 10B. A computer located at the point C tracks a target which has moved from the point M at the memory point instant to the point P at the present instant and the problem is to solve for some future position F of the target assuming that it continues to move along the straight line MPF. If the future position required were merely some fixed time after the present, the problem of explanation would be relatively simple, but in the present case it is complicated by the fact that the time of flight of the target from the point P to the point F must equal the time of flight of a projectile fired now from a gun at the point C toward the point F so that the projectile and the target will arrive simultaneously at the point F. The memory point position is represented by a vector $$\vec{D}_m$$

whose direction is that of the target from the computer at the memory point instant and whose magnitude is the target range at that point. Similarly the present position is represented by the vector $$\vec{D}_p$$

and the future position is represented by the vector $$\vec{D}_f$$

Corrections for superelevation etc. are not considered in this elementary part of the discussion. From a range finder, we know the memory instant range $D_m$ which is the magnitude of the vector $$\vec{D}_m$$

Similarly we know the present slant range of the target $D_p$, the magnitude of the vector $$\vec{D}_p$$

The subtraction of these two vectors gives the vector $$\vec{S}.t_m$$

directly. From a suitable clock mechanism, the time interval $t_m$ between the memory point instant and the present is determined and the vector $$\vec{S}.t_m$$

divided by this time interval gives the target velocity $$\vec{S}$$

directly. The clock mechanism consists of a tuning-fork controlled synchronous motor which drives a potentiometer so that the output of the potentiometer is continuously divided by a factor proportional to the time interval subsequent to the memory point instant.

The speed and direction of the target $$\vec{S}$$

of course determines the lead vector $$\vec{S}.t_f$$

provided the time interval $t_f$ is known. However, the only thing we known about this time interval is that it must equal the time of flight of the projectile along the vector $$\vec{D}_f$$

If the time interval between the memory point and the present is $t_m$ and the predicted time of flight is $t_f$ then the vector $$\vec{S}.t_f$$

has a magnitude $$\frac{t_f}{t_m}(\vec{S}.t_m)$$

The vector $$\vec{D}_f$$

will result if vector $$\vec{S}.t_f$$

is added to vector $$\vec{D}_p$$

In the actual computer, the solution of these vector triangles is broken into two parts as shown in Fig. 10B and the vectors of the left hand part are all divided by $t_m$. In the right hand triangle, which corresponds to the prediction solver the scale is changed in that each of the vectors is divided by $t_f$. With this change in scale, the two vectors corresponding to M'P' and P''F'' are equal and each equals $$\vec{S}$$

Solving for the vector $$\frac{\vec{D}_f}{t_f}$$

requires the vectors $$\frac{\vec{D}_p}{t_f}$$

and $$\vec{S}$$

to be known but in the right hand side of Fig. 10B the present range vector involves an unknown factor, the predicted time of flight $t_f$, which is not known until the magnitude of the vector $$\frac{\vec{D}_f}{t_f}$$

is known. However, by suitable mechanism to be described below this vector is continuously regenerated in the computer so that the device always give the required $$\frac{\vec{D}_f}{t_f}$$

which in turn give $$\frac{\vec{D}_p}{t_f}$$

All of this will be more fully understood in connection with the actual mechanism used but the vector diagram is given first to explain why the various quantities are set up or sought in the computer.

In Fig. 11 the circuit is shown schematically for the operation of the computer prior to the instant at which a memory point is selected. For clarity only single lines are used to indicate connections and each line may represent one or more leads, often two. The target is tracked for a certain length of time with the computer operating as shown in this diagram and then the switch knob 160 is moved to the memory point position. At that instant the computer selects the memory point and starts to operate as in Fig. 12 to be discussed later. That is, the operator moves the knob 160 from the "range" setting to the "Mem. Pt." and this by means of a series of switches changes the whole circuit from that shown in Fig. 11 to that shown in Fig. 12. The switches are all marked "S" in both figures and it will be seen that all of the switches have been changed from one setting to the other as one moves from the condition shown in Fig. 11 to that shown in Fig. 12.

Prior to the selection of the memory point the setting of a range finder (as in Fig. 13) feeds the slant range continuously to servomotor 178 which moves a potentiometer 170. This potentiometer modifies the output of a 5000 cycle oscillator 171 so that the current fed through an amplifier 172 to the range coil 173 of the memory point solver is proportional to present range. It will be recalled that the range coil axis is always pointing at the target (at least effectively). However, as pointed out in connection with Fig. 10B the computer uses $$\frac{D_p}{t_m}$$

rather than $D_p$ alone. This division is provided after the memory point has been selected, causing magnetic clutch 177 to engage, by a potentiometer 174 driven by a synchronous motor 179 operated by a 60 cycle oscillator 176. That is, the clutch 177 is held in the open position when the knob 166 is in the "range" position and is engaged as shown in Fig. 12 when the knob 160 is moved to the "Mem. Pt." position; manual or electromagnetic operation means is used for moving the clutch. The vector set up by the range dipole 173 is analyzed into its components (vertical, north-south, east-west), by pickup coils 180, 181, and 182. The voltages in these coils are matched by voltages applied through amplifier 189, from the time potentiometer 174 to variable transformer primaries 183, 184, and 185. The transformers are connected in series with amplifier 189 as shown by lines 193. Automatic adjustment of the transformers is provided by phase sensitive motors 186, 187, and 188. That is, these motors vary the setting of the transformers until the voltages do match as required, reducing the current in the transformer secondaries to zero, and then hold this setting. In practice a 5000 cycle signal modulated by 60 cycles is applied through leads 194 to each transformer to provide a 60 cycle driving current for the two phase motors 186, 187, and 188 whose phase with respect to the line input is the same as the phase of the 5000 cycle unbalance with respect to the modulated signal from the oscillator 171. At the instant the memory point is selected, these transformers are clamped in position so that by energizing the coils 180, 181, and 182 through these transformers, the memory point vector may be re-synthesized at any later instant for measurement of its components in terms of the later polar coordinates. At the same time the range vector is fed via a potentiometer 190 to a range mixing amplifier 191 (not active here) and another stage of amplification 192 to the range coil of the prediction dipole solver. Of course, until a memory point is selected, the memory point position and the present position are the same and moving together, which means that the future position is and remains the same as the present position. The actual gun position is then corrected only for ballistics such as superelevation.

The method by which the ballistic time of flight $t_f$ as a function of predicted range $D_f$ is computed will now be explained although in the circuit as shown in Fig. 11 there is no computation of lead angle to be modified by this ballistic. A potentiometer 215 is driven by a servomotor 216 to modify the range signal in accordance with the predicted time of flight. Thus the prediction range dipole coil 225 receives the present range divided by the predicted time of flight. The manner in which the servomotor 216 operates so as to set the potentiometer 215 exactly according to predicted time of flight will now be described. This motor is driven as indicated by line 217 by the output of an amplifier 218 which in turn receives the output of a modulator 219 operated in accordance with the voltage in the future range coil 211 of the prediction solver. Through leads 220 a 60 cycle modulated 5000 cycle signal comes to the modulator 219 and there is demodulated by the 5000 cycle unbalance signal producing a 60 cycle signal which drives the motor 216 (this is the same type of operation performed by the signal through leads 194). Thus the modulator 219 is phase sensitive and the motor 216 is turned until there is zero voltage on 219, i. e. the output of the potentiometer 221 is equal and opposite to the voltage induced in the range coil 211 by the signal in the range dipole 225. Whenever the voltage applied to modulator 219 differs from zero the motor 216 is driven to bring it back to zero again.

The potentiometer 221 is wound linearly but the potentiometer 215 (which is set simultaneously with the setting of the potentiometer 221) is wound non-linearly according to the ballistic relation between time of flight and average shell velocity. For example resistance as a function of angle of the potentiometer setting and as calculated from the ordnance ballistic tables for a 40 mm. gun is tabulated below. Actually the card on which the resistance wire is wound is tapered.

| Angle | Resistance Ratio |
|---|---|
| 0 | .0702 |
| 30 | .2783 |
| 60 | .4417 |
| 90 | .5625 |
| 120 | .6576 |
| 150 | .7372 |
| 180 | .8038 |
| 210 | .8598 |
| 240 | .9095 |
| 270 | .9539 |
| 300 | .9937 |

By throwing the switch 160 to the memory point position as shown in Fig. 12, a memory point is selected, the variable transformers 183, 184, and 185 are fixed in position and a memory time interval starts and is introduced into the computations by engagement of the clutch 177. These transformers 183, 184, and 185 are energized from the oscillator 171 through potentiometer 174, amplifier 189 and leads 193. As the memory point solver continues to track the target the three dipole coils 173, 203, and 204 receive induced voltages proportional to the components of the memory point vector which is now being synthesized continuously by the coils 180, 181, and 182. The term vector synthesis is here used to refer to the establishment of a magnetic field from three components. Actually all of these components are divided by the memory time, to correspond to the left hand side of Fig. 10B, by means of potentiometer 174 through amplifier 189 and leads 193. The output voltages of the dipole coils 173, 203, and 204 are fed through amplifiers 192, 163 and 164 to the prediction dipole coils 225, 226 and 227. The output of the azimuth coil 203 which is the component (in the direction of changing present azimuth) of the memory point range vector (divided by memory time), is fed to the prediction azimuth coil. The "present elevation" component of the memory point range i. e. the component in the direction of changing present elevation which is the output of the coil 204, is fed to the prediction elevation dipole. The present range component of the memory point range is subtracted from two other signals, in the range mixing amplifier 191 before it is fed to the prediction range dipole. Specifically it is subtracted from the present range (from potentiometer 170) divided by the memory time (from potentiometer 174) plus the present range (from potentiometer 190) divided by the predicted time of flight $t_p$ (from the potentiometer 215). The setting of the potentiometer 215 by motor 216 is determined regeneratively from the output of the prediction solver as discussed above, with the addition of a lead vector which affects the balance positions. The currents fed into the prediction dipole coils thus establish a predicted position vector in the form of a magnetic field. The components of this magnetic field in any coordinate reference system may be read directly by outside coil systems such as coils 210, 211, and 212. In the actual apparatus used, these coils are driven so that the "azimuth" pickup coil and the "elevation" pickup coil receive small induced voltages which exactly balance the correction voltages for azimuth-drift and superelevation respectively, as described below, which means that the axis of the range coils is parallel (except for the angular ballistic corrections) to the predicted position vector just set up by the dipole coils.

The manner in which superelevation is introduced into the calculations will now be described. Superelevation at any time is a function of predicted range and of gun elevation itself. More distant targets require more superelevation and the superelevation angle is greater when the gun aims horizontally than when it is at some greater elevation angle. There is no superelevation angle when the gun aims vertically upward.

As pointed out above, a voltage, referred to as the superelevation signal is imposed on the elevation coil 210 opposing the voltage induced therein by the predicted position vector. This superelevation signal is generated by passing a signal from the oscillator 171 through potentiometers 230 and 141. The potentiometer 230 is wound non-linearly but not the same as potentiometer 215. Since superelevation angle is to be the difference between the gun elevation angle and the predicted elevation angle, the calculation for winding the potentiometer 230 is made as follows. First assume some constant gun elevation and then plot from ballistic tables the superelevation as a function of future range divided by time of flight. This function should then be multiplied by the future range divided by time of flight which is the function imposed on the shaft as rotated by the motor 216, all as discussed previously. Thus the potentiometer 230 output is a signal relating superelevation to future range. This output is then passed through the potentiometer 141 which is also non-linearly wound to introduce the effect of the gun elevation itself. As shown by ballistic tables this function is approximately the cosine of the gun elevation. The winding is made in accordance with the ballistic tables in this respect. Thus the output of both potentiometers is a signal proportional to superelevation. This signal is imposed on the coil 210 to oppose the voltage induced therein. The motor 125 is then driven by the amplifier 233 and the modulator 234, rotating the coil 210 until there is zero voltage at the modulator 234. The operation of the modulator 234 is similar to that of 219 discussed above. Reference to Fig. 9 will show the mechanical location of the motor 125. As shown in Fig. 9 the motor 125 drives both the coils (210 of Fig. 12 specifically) and the potentiometer 141 (via shaft 127). Broken line 254 of Fig. 12 corresponds to this shaft 127.

For clarity, no correction for azimuth-drift is shown in Fig. 12 but such correction may be imposed on the coil 212 in the same way that superelevation is imposed on the coil 210. If this is done the motor 109 operated by amplifier 237 and modulator 238 drives the coil 212 until the voltage at modulator 238 is zero, indicating that the induced voltage is equal and opposite to the azimuth-drift signal. Again reference to Fig. 9 will show the mechanical location of motor 109.

Correction for wind is introduced in a somewhat different manner. Specifically the signal is set up in potentiometers 240, 241, and 242. The latter two are set manually in accordance with the north-south, east-west components of the wind velocity. Since, as shown by ballistic tables, the wind effect is dependent on predicted range, the signal to these potentiometers 241 and 242 is modified in the potentiometer 240 which happens to give a close approximation to the correct function when wound linearly, but with a constant resistance in series therewith as compared to the simple $$\frac{D_p}{t_p}$$

function given by the setting of the shaft by the motor 216. These wind vector components from the potentiometers 241 and 242 is imposed on the memory point vector solver as corrections to the north-south and east-west signals. The wind vector thus is incorporated into the computations at an early stage and carries through the whole computing cycle, giving the necessary corrections to the azimuth and elevation settings of the gun and the predicted time of flight.

Figure 13:
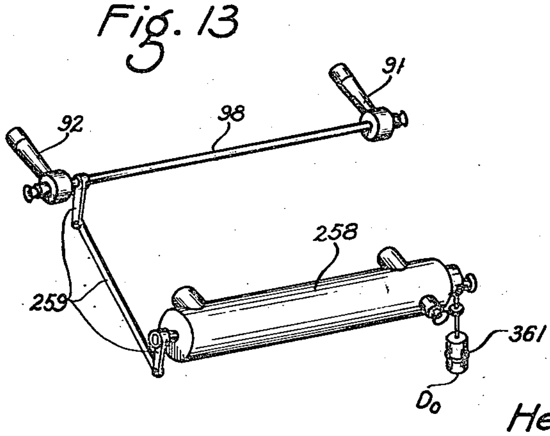

Fig. 13 shows an optical range finder 258 which by means of a selsyn transmitter 361 provides the range signal $D_0$ for the potentiometer drive 178 of Figs. 11 and 12. This range signal may alternatively be supplied directly from a radar unit which controls the setting of a transmitter selsyn motor such as 361. As will be discussed in connection with Fig. 16, two selsyn systems may be used to drive coarse and fine selsyn receivers (247 and 248 of Fig. 16). In Fig. 13 the range finder 258 is mounted on the housing (not shown) of the director to rotate therewith in azimuth and is connected directly by linkage 259 to shaft 98 to rotate in elevation with the tracking telescopes 91 and 92. It is of course quite feasible to have direct mechanical connection between an optical range finder and the potentiometer 170 but it is simple to describe with respect to a selsyn drive mechanism.

Figure 14:
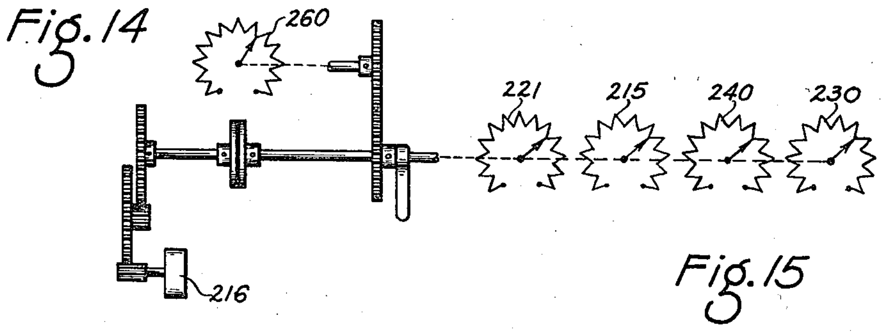

Fig. 14 shows the mechanical coupling of the potentiometers 221, 215, 230, and 240 so that they are operated simultaneously by the servomotor 216 forming part of the servo system finding predicted time of flight. Potentiometer 260 is connected to the modulator system 219 for adjustment of the servo sensitivity. This auxiliary potentiometer is not essential to the system but it increases the precision obtainable with the particular potentiometer system described.

Figure 15:
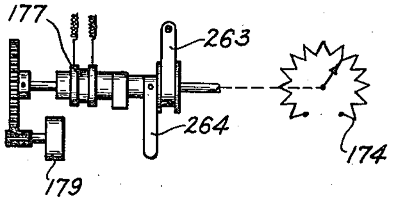

Fig. 15 similarly shows the details of the potentiometer 174 which is coupled by a magnetic clutch 177 to a synchronous motor 179. As described above, the clutch 177 is open in Fig. 11 and closed in Fig. 12 by either mechanical or electromagnetic means when the switching knob 160 is moved. The spring 263 and stop 264 insure that the potentiometer 174 always returns to and starts from a zero setting. That is, as soon as the clutch 177 releases the potentiometer, the coil spring 263 turns the potentiometer back to zero at which point it is stopped by a detent or stop 264.

Figure 16:
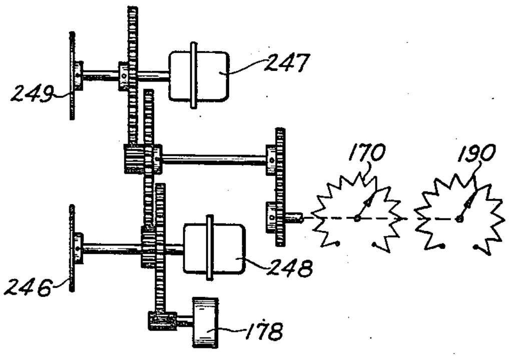

Fig. 16 shows the mechanical details for operation of the potentiometers 170 and 190 by the servomotor 178. The motors 247 and 248 are receivers in selsyn systems to receive slant range from a range finder. The motor 178 is operated to balance selsyn 248, and thus to put the slant range setting into potentiometers 170 and 190. Scales 249 and 246 show range (coarse and fine), specifically at 50,000 yards and 2000 yards per turn respectively.

Figure 17:
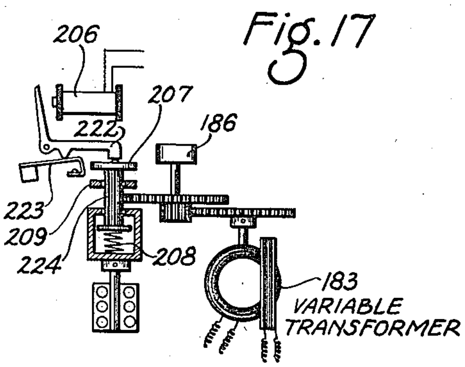

Fig. 17 shows the details of a variable transformer unit such as 183, 184, or 185. The variable transformer 183 is driven by a servomotor 186 until a memory point is selected at which time the solenoid 206 is energized (by the closing of still another switch when the knob 160 is moved to the "Mem. Pt." setting) causing the lever arm 222, against the force of springs 223 and 208 to force the pinion 224 downward until there is a braking action between the upper plate 207 of this pinion and the ring 209. Thus the variable transformer 183 is clamped after a memory point has been selected.

Figure 18:
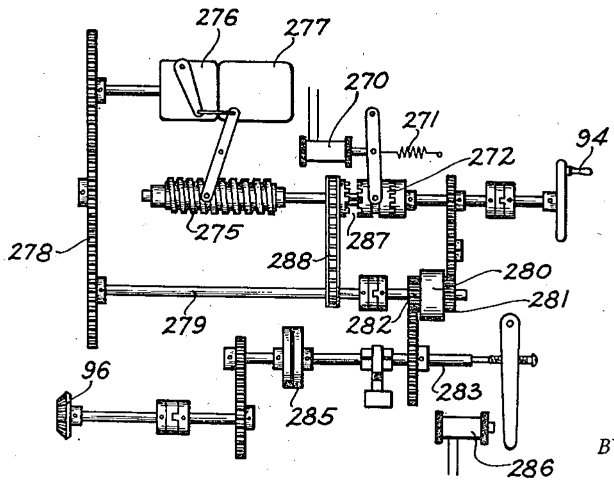

Fig. 18 shows an aided tracking unit such as units 95 and 102 of Fig. 9. It will be described specifically with respect to unit 95. As shown in Fig. 18, a choice may be made between direct manual drive and aided tracking merely by energizing or de-energizing the solenoid 270. In a de-energized position shown, the spring 271 allows engagement of the clutch 272 so that rotation of the hand wheel 94 rotated a worm 275 which sets the speed of a variable speed drive 276 operated by a 1/6 horsepower motor 277. Through a gear 278 this continuous drive is transmitted to a shift 279 which rotates the cage 280 of a differential gear.

Through an idler gear, the turning of the hand wheel 94 also introduces displacement into one side 281 of the differential. From the other side 282 of the differential a counter shaft 283 takes the sum of the rate generated in the shaft 279 and displacement generated by the gear 281 and through a disc clutch 285 transmits it to drive the gear 96. The disc clutch 285 is operated by a solenoid 286. With this arrangement, rotation of the hand wheel 94 brings the Graham variable drive 276 to the correct setting for constant tracking at which time no further movement of the hand wheel 94 is required to maintain the constant tracking. However any change in the elevation component of the velocity of the target requires the hand wheel to be moved.

The benefits of aided tracking may be discarded at will by energizing the solenoid 270 which disconnects the hand wheel 94 from the worm 275. At the same time a clutch 287 engages, so that through a chain drive 288 the turning of the shaft 279 drives the worm 275 to a mean setting at which time the output of the Graham drive 276 is stationary. Under these conditions there is no rate output on the cage 280 of the differential and hence the operation is entirely manual from the hand wheel 94 through gears 281 and 282 to the shaft 283. When the solenoid 286 is de-energized, there is no connection from the hand wheel 94 to the computer mechanism, which protects the mechanism when the power is off.

I claim and desire to secure by Letters Patent of the United States:

1. A vector solver comprising one part having at least one dipole electric coil wound on a substantially spherical core with the turns of the coil distributed effectively uniformly with distance along a diameter of the sphere which diameter is the dipole axis, another part entirely outside said sphere having at least three electric coils each having mutual inductance with the dipole coil, the three outside coils having their axes mutually perpendicular like three dimensional rectilinear coordinated axes, means for supporting the parts for relative rotation only about the center of the sphere, means for applying alternating electric current of at least one frequency to one of the coils and signal transmitting means responsive to the voltage induced in the other coil.

2. A vector solver according to claim 1 in which the turns of the dipole coil are grouped in equal groups in planes substantially uniformly spaced along said diameter.

3. A vector solver according to claim 1 in which the turns of the dipole coil are grouped into equal groups in planes distributed along said diameter so as to give mutual inductance closely proportional to the cosine of the angle through which the parts are relatively rotated from the position in which the mutual inductance is zero.

4. A vector solver according to claim 1 in which the turns of the dipole coil are grouped into equal groups in planes precisely uniformly spaced along said diameter and in which said core is very slightly spheroidal to give mutual inductance closely proportional to the cosine of the angle through which the coils are rotated from the position of maximum mutual inductance.

5. A vector solver according to claim 1 in which at least one of the three coils of said another part consists of two sections connected together and in approximately parallel planes on opposite sides of the sphere, whereby errors in the setting of the relative positions of the two parts are corrected at least to a second degree.

6. A vector solver according to claim 1 in which said one part includes in addition to said one dipole coil, two other dipole coils concentric with said one dipole coil and with their axes perpendicular to that of said one dipole coil and perpendicular to each other, the three dipole coil axes thus being also oriented like three dimensional rectilinear coordinate axes.

7. A vector solver according to claim 1 in which the dipole coil includes at least eight equal groups of turns in planes substantially uniformly distributed along said diameter.

8. A computer for finding a future position of a target moving relative to the computer which future position has the proper lead in terms of the time of flight of a projectile from the computer to the target, comprising a base for the computer, two vector solver systems referred to as the memory point solver and the prediction solver, each having a spherical core on which are wound three dipole electric coils with their axes mutually orthogonal referred to as the range, azimuth and elevation coils of the memory point solver and the range, azimuth and elevation coils of the prediction solver, means for keeping the axes of the range coils of both solvers pointing effectively at the target, means for producing alternating electric current proportional to the range of the target from the computer, means for applying the range current to the range coil of the memory point solver, three outside coil systems with their axes mutually orthogonal, one of them pointing in a direction referred to as vertical and all three fixed relative to the base of the computer, which three outside coil systems are outside of and near the memory point dipole coils for receiving induced voltages respectively proportional to the direction cosines of the range current in the range coil, three current control means, means for setting said control means in accordance with said induced voltages at some instant referred to as the memory point instant and for simultaneously disconnecting the range coil of the memory point solver from the range current applying means, means including the current control means for applying to the coil systems, after the memory point instant, currents proportional to said induced voltages divided by the time interval following the memory point instant, means for driving the spherical core of the memory point dipole coils to maintain the axes of the azimuth and elevation coils pointing respectively in the directions of changing azimuth and changing elevation of the target while the axis of the range coil points toward the target, elevation being with respect to said vertical direction which means that the plane containing the range and elevation axes is vertical, and the azimuth axis is orthogonal to the range and elevation axes, whereby the voltages induced in the three dipole coils of the memory solver are proportional to the present, as contrasted to the memory point instant, components, in polar coordinates, of the memory instant range divided by said time interval, means for feeding to the prediction azimuth dipole coil, a current proportional to the present azimuth component of the memory instant range divided by said time interval, means for feeding to the prediction elevation dipole coil, a current proportional to the present elevation component of the memory instant range divided by said time interval, means for feeding to the prediction range dipole coil, a current proportional to the present range from the range finding means, divided by said time interval plus the present range from the range finding means, divided by the time from the present until the target is in the future position to be predicted referred to as the predicted time of motion of the target, regenerated from unit A defined below, minus the present range component of the memory instant range divided by said time interval, whereby the currents in the prediction dipole coils are components of and, in the form of a magnetic field, define a predicted position vector having the magnitude and direction of the predicted range to the predicted position, the magnitude being divided by the predicted time of motion of the target, three pickup coil systems referred to as future range, azimuth and elevation coils, mounted with their axes mutually orthogonal, which pickup coil systems are outside of and near the prediction dipole coils for receiving induced voltages respectively proportional to the direction cosines of the predicted position vector with reference to the axes of the pickup coil systems, means for orienting and maintaining the pickup coil systems so that the induced azimuth and elevation voltages therein are zero whereby the range coil axis is parallel to the predicted position vector whereby the required direction is mechanically defined, said unit A consisting of two potentiometers coupled together in which a constant intensity current is imposed across the first potentiometer and its output is adjusted until the output voltage matches that of the predicted range coil whereby the setting of the first potentiometer is proportional to the magnitude of the predicted position vector which magnitude is the predicted range divided by the predicted time of motion and which equals that in the predicted range coil since the range coil axis is parallel to the vector and in which the second potentiometer is non-uniformly wound to have a resistance distribution in accordance with the ballistic function relating range to the time of motion of the projectile from the computer position to the future target position which must equal the predicted time of motion of the target and in which the setting of the second potentiometer is coupled directly to that of the first potentiometer whereby the output of the second potentiometer is independent of the predicted range and is inversely proportional only to the predicted time of motion, which second potentiometer output is multiplied by the present range voltage from the range finding means and as thus continuously regenerated from the induced voltage in the predicted range coil is fed into the prediction range dipole coil along with two other items added algebraically as defined above with respect to current feeding means.

9. A computer according to claim 8 in which the future azimuth and future elevation pickup coil systems include adjustable potentiometers for modifying the induced voltages in these coil systems respectively proportionally to azimuth drift and superelevation.

HENRY HARRISON.

REFERENCES CITED

The following references are of record in the file of this patent:

UNITED STATES PATENTS

| Number | Name | Date |
|---|---|---|
| 1,942,079 | Willard | Jan. 2, 1934 |
| 2,065,303 | Chaffee et al. | Dec. 22, 1936 |
| 2,080,186 | Reymond | May 11, 1937 |
| 2,407,325 | Parkinson | Sept. 10, 1946 |
| 2,408,081 | Lovell et al. | Sept. 24, 1946 |
| 2,417,229 | Alexanderson | Mar. 11, 1947 |
| 2,433,843 | Hammond, Jr. et al. | Jan. 6, 1948 |
| 2,442,597 | Greenough | June 1, 1948 |
| 2,467,646 | Agins | Apr. 19, 1949 |

FOREIGN PATENTS

| Number | Country | Date |
|---|---|---|
| 56,392 | Netherlands | June 15, 1944 |